United States Patent
Sundheimer

(10) Patent No.: US 8,577,086 B1
(45) Date of Patent: *Nov. 5, 2013

(54) POST-BLOB ANALYSIS METHOD AND ARTICLE OF MANUFACTURE

(75) Inventor: Brent James Sundheimer, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/160,266

(22) Filed: Jun. 14, 2011

Related U.S. Application Data

(62) Division of application No. 13/160,118, filed on Jun. 14, 2011.

(51) Int. Cl.
*G06K 9/00* (2006.01)
*H04N 11/08* (2006.01)

(52) U.S. Cl.
USPC .......................................... 382/103; 348/490

(58) Field of Classification Search
USPC ......... 382/103, 107, 209, 217, 218, 226, 236; 348/129, 154, 155, 169, 179, 456, 490, 348/620
See application file for complete search history.

(56) References Cited

U.S. PATENT DOCUMENTS 7,466,844 B2 * 12/2008 Ramaswamy et al. ........ 382/103

* cited by examiner

*Primary Examiner* — Abolfazl Tabatabai
(74) *Attorney, Agent, or Firm* — Christopher L. Blackburn

(57) ABSTRACT

An article of manufacture and method for performing post-BLOB analysis.

17 Claims, 13 Drawing Sheets

POST-BLOB ANALYSIS METHOD AND ARTICLE OF MANUFACTURE

CROSS REFERENCE TO RELATED APPLICATIONS

This application is filed as a divisional patent application of, and claims priority to, prior filed U.S. patent application having Ser. No. 13/160,118, filed Jun. 14, 2011 which is hereby incorporated in full.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

FIELD OF THE INVENTION

The invention generally relates to post-BLOB analysis, more specifically to image processing to identify objects not of interest.

Figure 1:
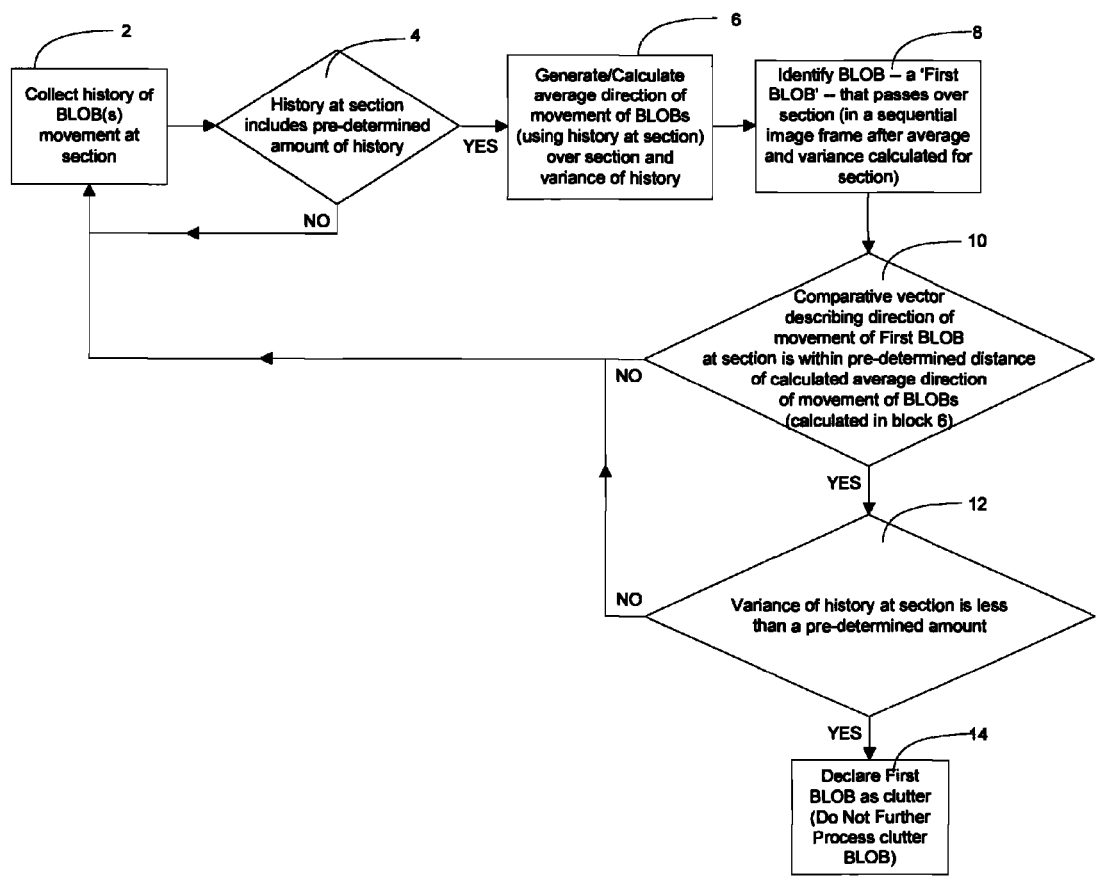
FIG. 1 is a high level flow chart of an embodiment of the invention.
Figure 2:
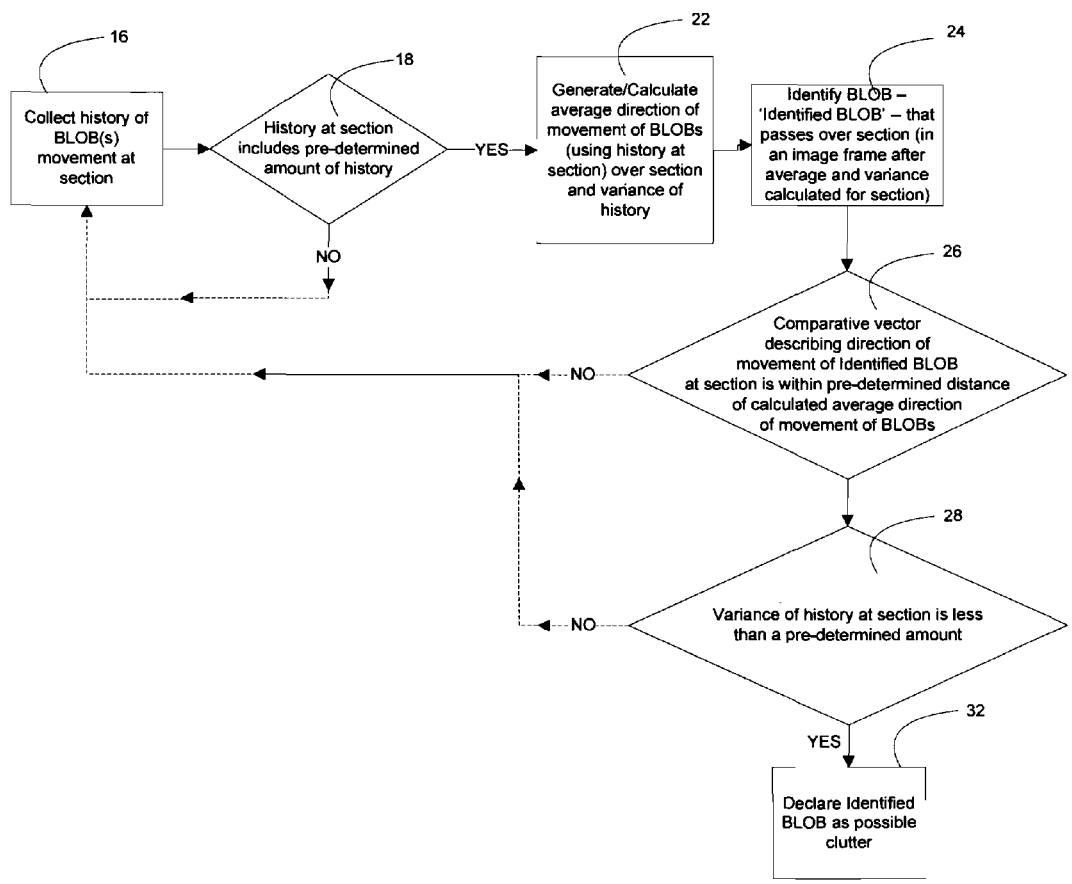
FIG. 2 is a high level flow chart of an embodiment of the invention.

It is to be understood that the foregoing and the following detailed description are exemplary and explanatory only and are not to be viewed as being restrictive of the present invention, as claimed. Further advantages of this invention will be apparent after a review of the following detailed description of the disclosed embodiments, which are illustrated schematically in the accompanying drawings and in the appended claims.

DETAILED DESCRIPTION

Embodiments of the invention generally relate to post-binary large object ("post-BLOB") analysis. BLOB analysis generally encompasses image processing techniques constructed to classify data into binary large objects ("BLOBs") and calculate statistics for each BLOB.

Embodiments may be implemented as a method and/or an apparatus or article of manufacture having stored thereon one or more machine executable instructions and/or data files which (when executed by appropriate machine) cause the machine to perform the described method. The term "article of manufacture" as used herein is intended to encompass one or more machine-readable medium (devices, carriers, or media), including, for example, a magnetic storage media, "floppy disk", CD-ROM, RAM, a PROM, an EPROM, a FLASH-EPROM, any other memory chip or cartridge, a file server providing access to the programs via a network transmission line, holographic unit, a memory circuit within an integrated circuit, etc. The machine that executes the machine executable instructions (software, program, etc.) stored on the machine-readable medium can be any electronic device capable of executing the instructions of a computer program stored on the machine-readable media. Of course, those skilled in the art will recognize that many modifications may be made to this configuration without departing from the scope of the present invention.

The meaning of the terms 'Sequential Image Frame', 'Track', 'BLOB', and 'VIDEO SEQUENCE' as used in this specification, including the claims, is as follows:

Sequential image frame: A single two dimensional image that occurs in a video sequence.

BLOB Track—A set of coordinates that correspond to the path of an object over a period of time. These coordinates can be definite (aka GPS) or relative (aka pixel coordinates in an image).

BLOB—A set of coordinates that correspond to the position of an object at a point in time. These coordinates can be definite (aka GPS) or relative (aka pixel coordinates in an image).

VIDEO SEQUENCE—A set of sequential image frames representing a scene in motion.

A description of the general invention is first presented, followed by non-exclusive, exemplary, descriptions of various implementations and embodiments of the invention.

General Invention

As embodiments of the invention are performed, input information about at least one BLOB (including a plurality of point coordinates and a history of the movement of BLOBS at the point coordinates over time) is collected by the embodiment (which is provided by a tracking algorithm). Embodiments of the invention claimed and described herein use the input information (a plurality of point coordinates and a history of the movement BLOBS at the point coordinates over time) as an input workpiece; embodiments are independent from the tool used to generate the input information. Any known tracking algorithm that generates the input information (as defined herein) will do; also, note that embodiments of the invention may also be applied to any multidimensional system where time and positional data is known for multiple moving objects, including GPS sensors—where the time and positional data is definite as opposed to relative.

Each BLOB having a pre-determined point at a particular section of the sequential image frame and a tracking history at that particular section will contribute to a movement history associated with that particular section. Note that a 'particular section' of a sequential image frame refers to an element on the image (such as, for example, a pixel, an object such as, for example, a car or person, a GPS signal, etc); in accordance with the principles of the invention, any pre-determined element can be used. The movement history is data that represents a history of the direction of movement of a pre-determined point of at least one BLOB over a section of a sequential image frame (of a video sequence). In some embodiments, the a particular section's collected history does not include all of the movement history associated with that particular pixel; in these embodiments, the amount of collected history is capped—once the cap is reached subsequently encountered history is collected while the oldest history data is discarded from the history. In some embodiments, the history includes a plurality of unit vectors; in these embodiments, each of the plurality of unit vectors describes the motion of one of a contributing BLOB in time for each BLOB having a pre-determined point passing over/on the section up to a pre-determined amount (in some embodiments, the pre-determined amount is the same amount as the cap amount set for collected history).

Once a section has a deep enough collected history, as defined by having a specified number of (pre-determined point of) BLOBS (ore one BLOB in multiple image frames) pass over the section, a mean and variance of the collected history is calculated for the section; in embodiments where unit vectors represent the historical BLOB movement at a section, a mean and variance of the unit vectors are calculated for the section.

When another BLOB passes over a section for which a mean and variance has been calculated (which does not occur until a sufficient amount of history at that section has been collected), the motion of the (another) BLOB (at that section) is compared against the mean of the history of the section.

In some embodiments, the (another) BLOB is designated to be permanent (background) clutter when both:

The mean of the unit vectors in the history of the section is within a certain distance of the unit vector associated with the motion of the BLOB; and The variance of the unit vectors in the history of the section is within a certain bound.

Once a BLOB is declared to be permanent clutter, the BLOB (and its track) is not passed on to subsequent systems that do not analyze objects determined to be background clutter; declaring a BLOB to be permanent clutter represents taking an action with respect to the BLOB that is consistent with the BLOB being an object not of interest.

In other embodiments, the (another) BLOB will not be declared background clutter unless the (another) BLOB satisfies the above defined mean and variance requirements over the course of a pre-determined amount of (in some embodiments, a predetermined amount of consecutive) frames.

In some embodiments, a smoothing algorithm is used upon the history in order to reduce the clutter even further by enlarging the size of a BLOB.

Some embodiments of this invention have been tested using an infrared search and tracking (IRST) program, as an input and a test video overlooking a freeway of Los Angeles. The algorithm in these embodiments is preluded by a blob detection and tracking algorithm. The clutter suppression technique recognizes the repetitive pattern of cars on the freeway and by matching their movement vectors, eliminates 95-99% of the moving objects (cars in this case) that are not of interest, or clutter since they all follow a similar path in the video, while other objects of interest are recognized as outliers and not eliminated.

Embodiments of the invention use information/data in the time domain as well as the 2-d information.

Various Additional Exemplary Embodiments

A non-exclusive description of additional exemplary embodiments of the invention is presented in 'Additional Exemplary Embodiments Section 1', 'Additional Exemplary Embodiments Section 2', 'Additional Exemplary Embodiments Section 3', 'Additional Exemplary Embodiments Section 4', and 'Additional Exemplary Embodiments Section 5'. Each Additional Exemplary Embodiments Section describes some of a plurality of embodiments consistent with principles of the invention.

Additional Exemplary Embodiments Section 1: These embodiments are implemented as method(s), and/or plurality of machine executable instructions (accessed by the machine via an article of manufacture on which the instructions are stored) that (when executed by the machine) cause the machine to perform a method(s), described in this 'Additional Exemplary Embodiments Section 1'.

Once a BLOB is declared to be permanent clutter, the BLOB (and its track) is not passed on to subsequent systems that do not analyze objects determined to be background clutter; declaring a BLOB to be permanent clutter represents taking an action with respect to the BLOB that is consistent with the BLOB being an object not of interest, such as, for example, taking an action (for example processing the BLOB by flagging it) that prevents the permanent-clutter-declared BLOB from being passed on to subsequent system(s) that are not intended to analyze objects determined to be background clutter.

With reference to FIG. 1, these embodiments include, providing a video sequence; the video sequence includes a plurality of sequential image frames, each of the plurality of sequential image frames having at least one BLOB and at least one section. In some embodiments, the at least one section(s) are pixel(s).

These embodiments further include, for at least one of the at least one section, collecting a history of the direction of movement of a pre-determined point of at least one of the at least one BLOB over the at least one of the at least one section of a sequential image frame of the plurality of sequential image frames 2. In some embodiments, the history of the at least one of the at least one section is captured in memory using a plurality of unit vectors; each of the plurality of unit vectors describes the direction of movement of a pre-determined point of at least one of the at least BLOB over the at least one of the at least one section of the sequential image frame.

These embodiments further include generating an average direction of movement (and its variance) of a pre-determined point of the at least one of the at least one BLOB over the at least one of the at least one section 6 when the collected history at the at least one of the at least one section includes at least a pre-determined amount of history 4. In embodiments in which the history is captured in memory using a plurality of base unit vectors that describe the direction of movement of a pre-determined point of the at least one of the at least one BLOB over the at least one of the at least one section of the sequential image frame, the 'average direction of movement' is the mean direction of a plurality of the set of base unit vectors representing direction of movement of each of the at least one of the at least one BLOB having a predetermined point that passes over the at least one of the at least one section.

These embodiments further include declaring a 'First BLOB' (of the at least one BLOB) that passes over the at least one of the at least one section in n sequential image frame after average and variance have been calculated 8. A 'First BLOB', as used in description of these Section 1 embodiments, is an arbitrarily chosen name designating any BLOB of the at least one BLOB that passes over the at least one of the at least one section in a sequential image frame after average and variance have been calculated for the at least one of the at least one section.

These embodiments further include declaring the 'First BLOB' to be clutter 14 when a predetermined point on the First BLOB passes over the at least one of the at least one section after a mean and variance has been calculated for the at least one of the at least one section, and: it has been determined that a comparative vector describing the direction of movement of the 'First BLOB' at the at least one of the at least one section is within a predetermined distance of the calculated average direction of movement at the at least one of the at least one section 10; and it has been determined that the variance of the direction of movement at the at least one of the at least one section is less than a pre-determined amount 12.

Additional Exemplary Embodiments Section 2: These embodiments are implemented as method(s), and/or plurality of machine executable instructions (accessed by the machine via an article of manufacture on which the instructions are stored) that (when executed by the machine) cause the machine to perform a method(s), described in this 'Additional Exemplary Embodiments Section 2'.

Once a BLOB is declared to be permanent clutter, the BLOB (and its track) is not passed on to subsequent systems that do not analyze objects determined to be background clutter; declaring a BLOB to be permanent clutter represents taking an action with respect to the BLOB that is consistent with the BLOB being an object not of interest, such as, for example, taking an action (for example processing the BLOB by flagging it) that prevents the permanent-clutter-declared BLOB from being passed on to subsequent system(s) that are not intended to analyze objects determined to be background clutter.

These embodiments include, providing a video sequence; the video sequence is comprised of a plurality of sequential image frames, with each of the plurality of sequential image frames having at least one BLOB(s) and at least one section(s).

With reference to FIGS. 2-5, these embodiments include collecting, for the at least one section(s), a history of the direction of movement of at least one BLOB over the at least one section(s) (in a plurality of sequential image frames in a video sequence) 16.

These embodiments further include, for each of at least one of the at least one section(s), generating an average direction of movement (and its variance) of a pre-determined point of at least one of the at least one BLOB over the at least one of the at least one section(s) 22 when the collected history at the at least one of the at least one section(s) includes at least a pre-determined amount of history 18. In embodiments in which the history is captured in memory using a plurality of base unit vectors that describe the direction of movement of a pre-determined point of the at least one of the at least one BLOB over the at least one of the at least one section(s), the 'average direction of movement' is the mean direction of a plurality of the set of base unit vectors representing direction of movement of the at least one of the at least one BLOB(s) having a predetermined point that passes over the at least one of the at least one section.

These embodiments further include declaring an 'Identified BLOB' (arbitrarily chosen name) of the at least one BLOB(s) to be possible clutter 32 when a predetermined point on the Identified BLOB passes over at least one section of which an average direction of movement and variance have been calculated 24 and:
  a comparative vector describing the direction of movement of the Identified BLOB at the at least one section of which an average direction of movement and variance have been calculated is within a predetermined distance of the mean and variance of the at least one section 26; and
  the variance of movement at the at least section is less than a pre-determined amount 28.

Figure 3:
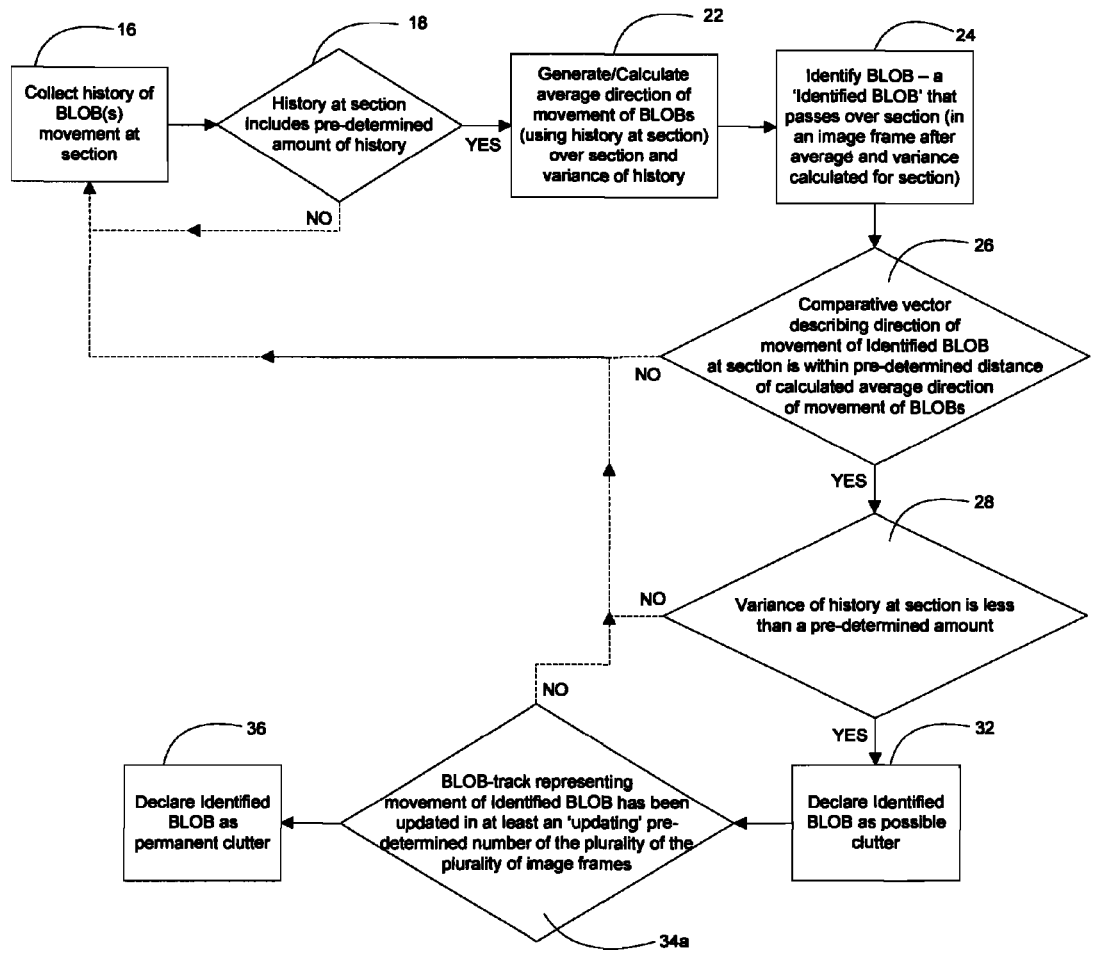
FIG. 3 is a high level flow chart of an embodiment of the invention in which a BLOB is not declared to be permanent clutter until its corresponding BLOB-track has been updated in at least an 'updating' pre-determined number of the plurality of the plurality of image frames according to embodiments of the invention.

With reference to FIG. 3, some of these embodiments further include declaring the 'Identified BLOB' to be permanent clutter 36 only after it has been determined that a BLOB-track representing the movement of the Identified BLOB has been updated in at least an 'updating' (arbitrarily named number designator) pre-determined number of the plurality of the plurality of frames 34a.

Figure 4:
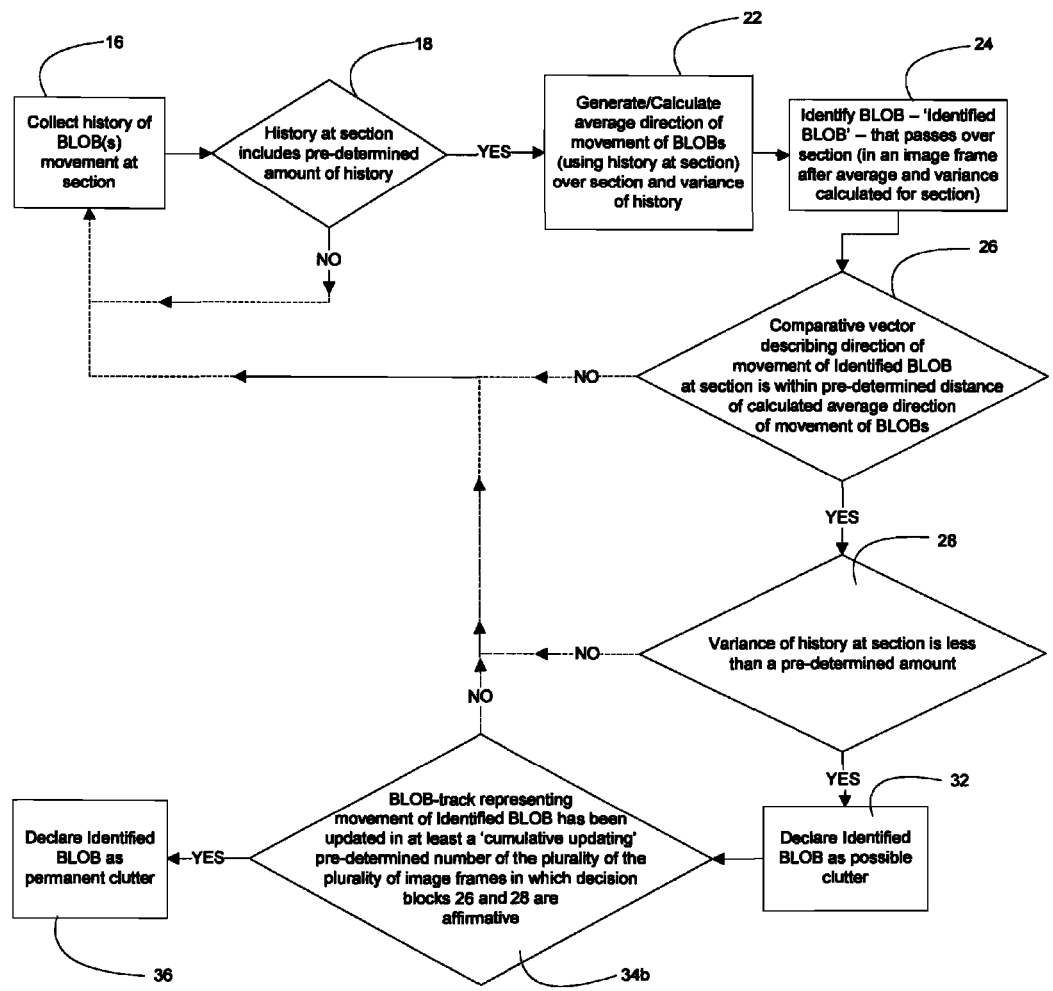
FIG. 4 is a high level flow chart of an embodiment of the invention in which a BLOB is not declared to be permanent clutter until its corresponding BLOB-track has been updated in at least an 'cumulative updating' pre-determined number of the plurality of the plurality of image frames according to embodiments of the invention.

With reference to FIG. 4, some of these embodiments further include declaring the 'Identified BLOB' to be permanent clutter 36 when it has been determined that a BLOB-track representing the movement of the 'Identified BLOB' has been updated in at least an 'cumulative updating' (arbitrarily named number) pre-determined number of a plurality of frames in which (see block 34b):
  the comparative vector describing the direction of movement of the Identified BLOB at the at least one of the plurality of sections having the associated plurality of base unit vectors is within the predetermined distance of the mean of the plurality of base unit vectors associated with the at least one of the plurality of sections; and
  the variance of the plurality of base unit vectors associated with the at least one of the plurality of sections is less than a pre-determined amount.

Note that the at least one section(s) of which an average direction of movement and variance have been calculated can be a single section (of which an average direction of movement and variance have been calculated) over which the 'Identified BLOB' passes during the course of the plurality of frames in the frames of which the cumulative pre-determined number of plurality of frames is comprised (for example when an 'Identified BLOB' has a looping pattern over the course of several frames causing the 'Identified BLOB' to pass over a single section multiple times over the course of multiple sequential image frames) or the at least one section(s) of which an average direction of movement and variance have been calculated can be different sections of at least some of the plurality of sequential image frames of which the cumulative pre-determined number of plurality of frames is included.

Figure 5:
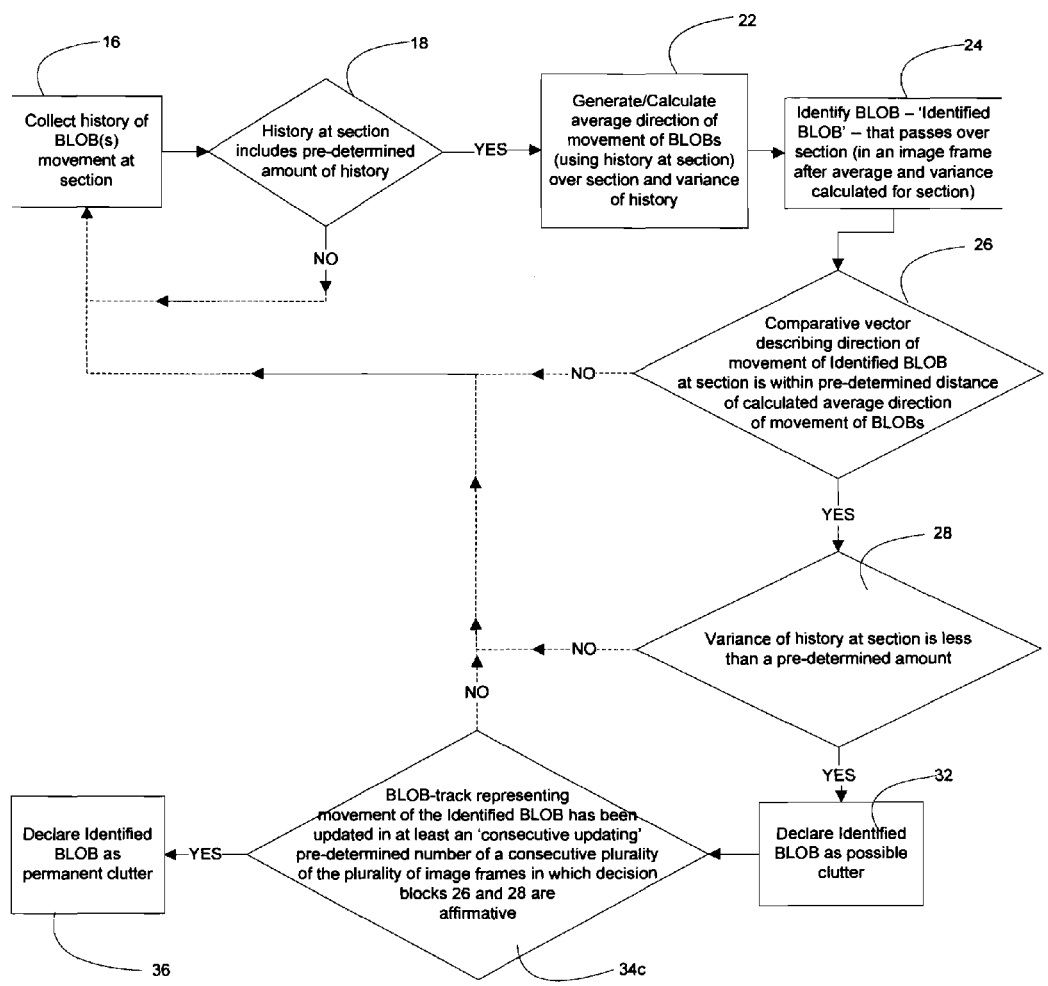
FIG. 5 is a high level flow chart of an embodiment of the invention in which a BLOB is not declared to be permanent clutter until its corresponding BLOB-track has been updated in at least a consecutive pre-determined number of the plurality of the plurality of image frames according to embodiments of the invention.

With reference to FIG. 5, some of these embodiments further include declaring the 'Identified BLOB' to be permanent clutter 36 when a BLOB-track representing the movement of the Identified BLOB has been updated in at least an 'consecutive updating' (arbitrarily named number) pre-determined number of a consecutive plurality of frames in which (see block 34c):

the comparative vector describing the direction of movement of the Identified BLOB at the at least one of the plurality of sections having the associated plurality of base unit vectors is within the predetermined distance of the mean of the plurality of base unit vectors associated with the at least one of the plurality of sections; and the variance of the plurality of base unit vectors associated with the at least one of the plurality of sections is less than a pre-determined amount.

Note that the at least one section(s) of which an average direction of movement and variance have been calculated can be a single section (of which an average direction of movement and variance have been calculated) over which the Identified BLOB passes during the course of the plurality of frames in the frames of which the consecutive pre-determined number of plurality of frames is comprised (for example when an Identified BLOB has a looping pattern over the course of several frames causing the Identified BLOB to pass over a single section multiple times over the course of multiple sequential image frames) or the at least one section(s) of which an average direction of movement and variance have been calculated can be different sections of at least some of the plurality of sequential image frames of which the consecutive pre-determined number of plurality of frames is comprised.

Additional Exemplary Embodiments Section 3: These embodiments are implemented as method(s), and/or plurality of machine executable instructions (accessed by the machine via an article of manufacture on which the instructions are stored) that (when executed by the machine) cause the processor to perform a method(s), described in this 'Additional Exemplary Embodiments Section 3'.

Once a BLOB is declared to be permanent clutter, the BLOB (and its track) is not passed on to subsequent systems that do not analyze objects determined to be background clutter; declaring a BLOB to be permanent clutter represents taking an action with respect to the BLOB that is consistent with the BLOB being an object not of interest, such as, for example, taking an action (for example processing the BLOB by flagging it) that prevents the permanent-clutter-declared BLOB from being passed on to subsequent system(s) that are not intended to analyze objects determined to be background clutter.

Figure 6:
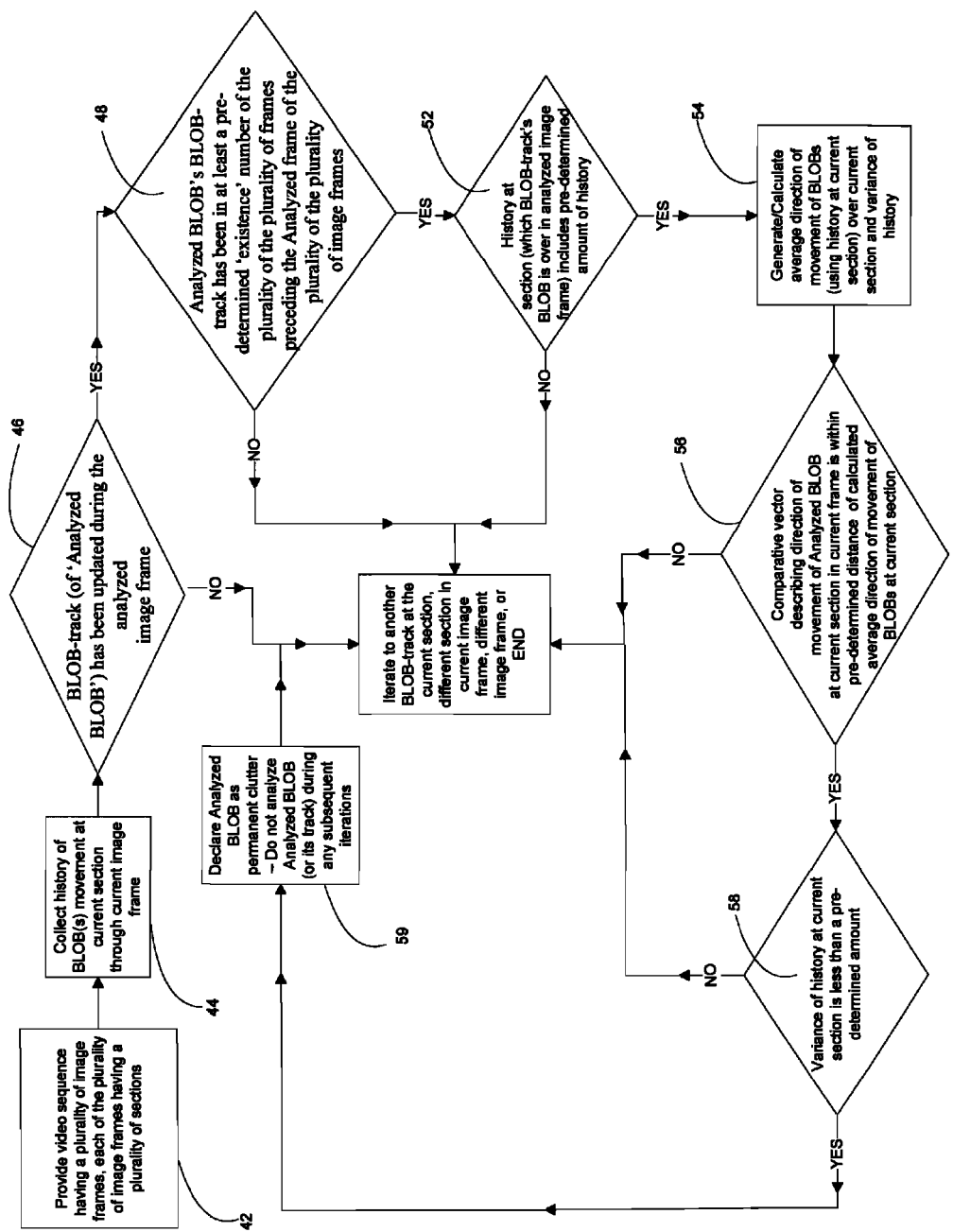
FIG. 6 is a high level flow chart of an embodiment of the invention in which a BLOB is declared clutter when (a pre-determined part of) the BLOB passes over a section of an image in a direction that is sufficiently similar to the direction of a history of the movement of BLOB(s) at the section and the variance of movement of BLOB(s) at the section is within a pre-determined amount according to embodiments of the invention.

With reference to FIG. 6, in some of these embodiments, the method includes providing a video sequence having a plurality of sequential image frames 42, each of the plurality of sequential image frames having a plurality of sections, the sequential image frames having at least one BLOB. In these embodiments, for a plurality of the plurality of sequential image frames, the method includes collecting a history of the direction of movement of at least one BLOB over at least one of the plurality of sections by generating a plurality of base unit vectors that describe the direction of movement of a pre-determined point of at least one of the at least one BLOB over the at least one of the at least one section(s) 44.

These embodiments further include, for the plurality of the plurality of sequential image frames and for each of the at least one of the plurality of sections, generating a mean and variance of a plurality of base unit vectors associated with one of the at least one of the plurality of sections representing direction of movement—at the one of the at least one of the plurality of sections with which the plurality of base unit vectors is associated—of each of the at least one BLOB having a predetermined point that passes over the one of the at least one of the plurality of sections 54 when:

an "Analyzed BLOB"'s BLOB-track has been updated during an analyzed of the plurality of the plurality of sequential image frames, the Analyzed BLOB's BLOB-track representing movement of its associated BLOB (an 'Analyzed BLOB' being a BLOB of the at least one BLOB(s) that is located in the analyzed of the plurality of the plurality of sequential image frames and in an area of the analyzed of the plurality of the plurality of sequential image frames corresponding to the location of the one of the at least one of the plurality of sections in the analyzed of the plurality of the plurality of sequential image frames) 46;

the Analyzed BLOB's BLOB-track has been in at least a pre-determined existence number of the plurality of the plurality of frames preceding the analyzed frame of the plurality of the plurality of sequential image frames 48; and the collected history of the one of the at least one of the plurality of sections includes at least a pre-determined amount of history 52.

In some of these embodiments, a Analyzed BLOB is declared to be permanent clutter 59 when:

a comparative vector describing the direction of movement of the Analyzed BLOB at the one of the at least one of the plurality of sections is within a predetermined distance of the mean of the plurality of base unit vectors associated with the one of the at least one of the plurality of sections 56; and the variance is less than a pre-determined amount 58.

Figure 7:
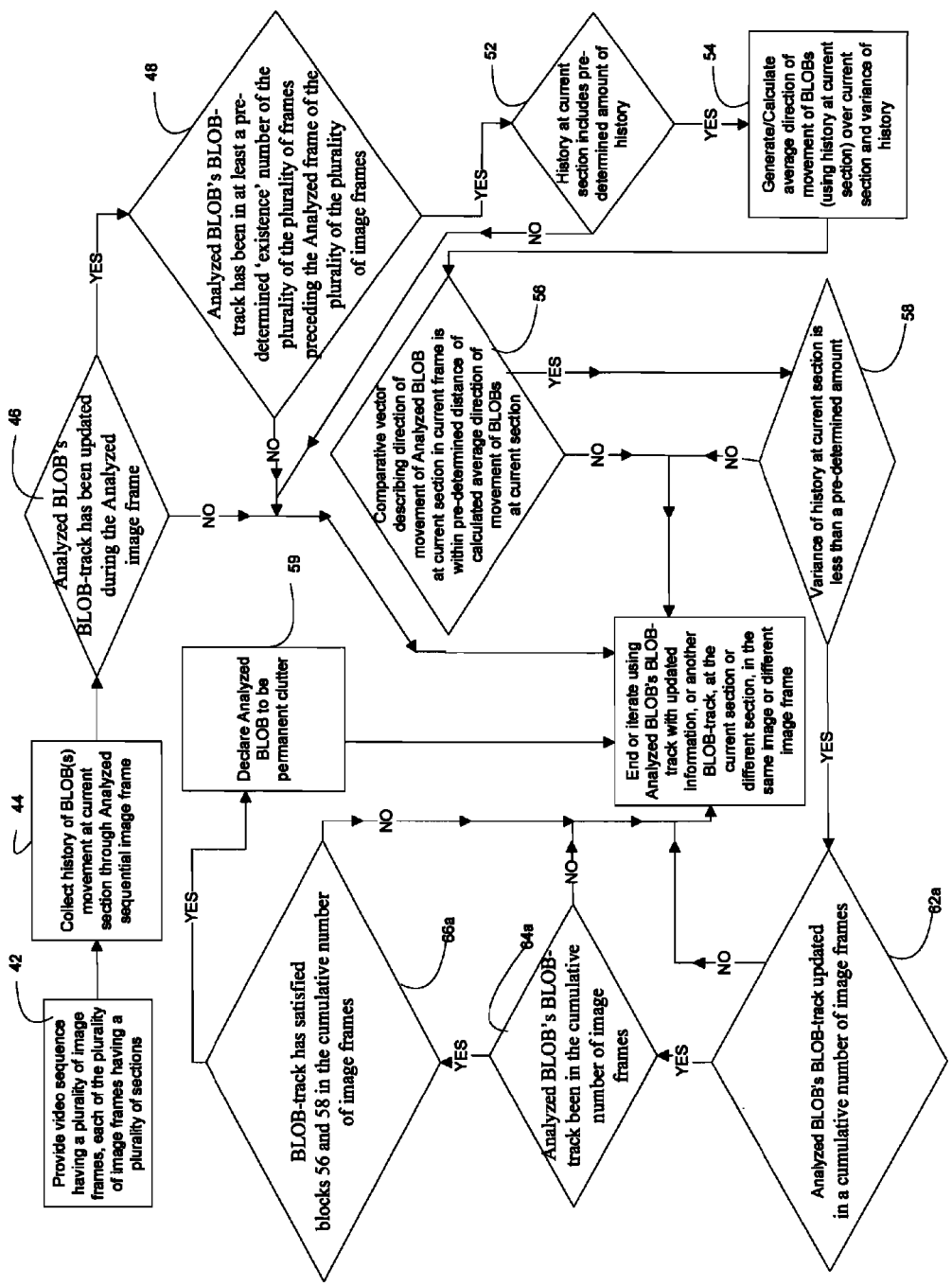
FIG. 7 is a high level flow chart of an embodiment of the invention in which a BLOB is declared clutter when, over the course of a plurality of image frames, the BLOB passes over a section of an image in a direction that is sufficiently similar to the direction of a history of the movement of BLOB(s) at the section and the variance of movement of BLOB(s) at the section is within a pre-determined amount according to embodiments of the invention.

With reference to FIG. 7, in others of these embodiments, the Analyzed BLOB is not declared to be permanent 59 clutter until each of the following has been determined to have occurred (so some of these embodiments include declaring the BLOB to be permanent clutter when):

the Analyzed BLOB's BLOB-track has been updated during a pre-determined 'cumulative' number of sequential image frames of the plurality of the plurality of sequential frames preceding the currently analyzed image frame of the plurality of the plurality of sequential image frames 62a;

the Analyzed BLOB's BLOB-track has been in at least an pre-determined cumulative number of sequential image frames of the plurality of the plurality of sequential frames preceding the currently analyzed image frame of the plurality of the plurality of sequential image frames 64*a;* a comparative vector describing the direction of movement of the Analyzed BLOB at the one of the at least one of the plurality of sections is within a predetermined distance of the mean of the plurality of base unit vectors in each of the cumulative number of sequential image frames of the plurality of the plurality of sequential frames preceding the currently analyzed image frame of the plurality of the plurality of sequential image frames 66*a*; and the variance is less than a pre-determined amount in each of the cumulative number of sequential image frames of the plurality of the plurality of sequential frames preceding the currently analyzed image frame of the plurality of the plurality of sequential image frames 66*a.*

Figure 8:
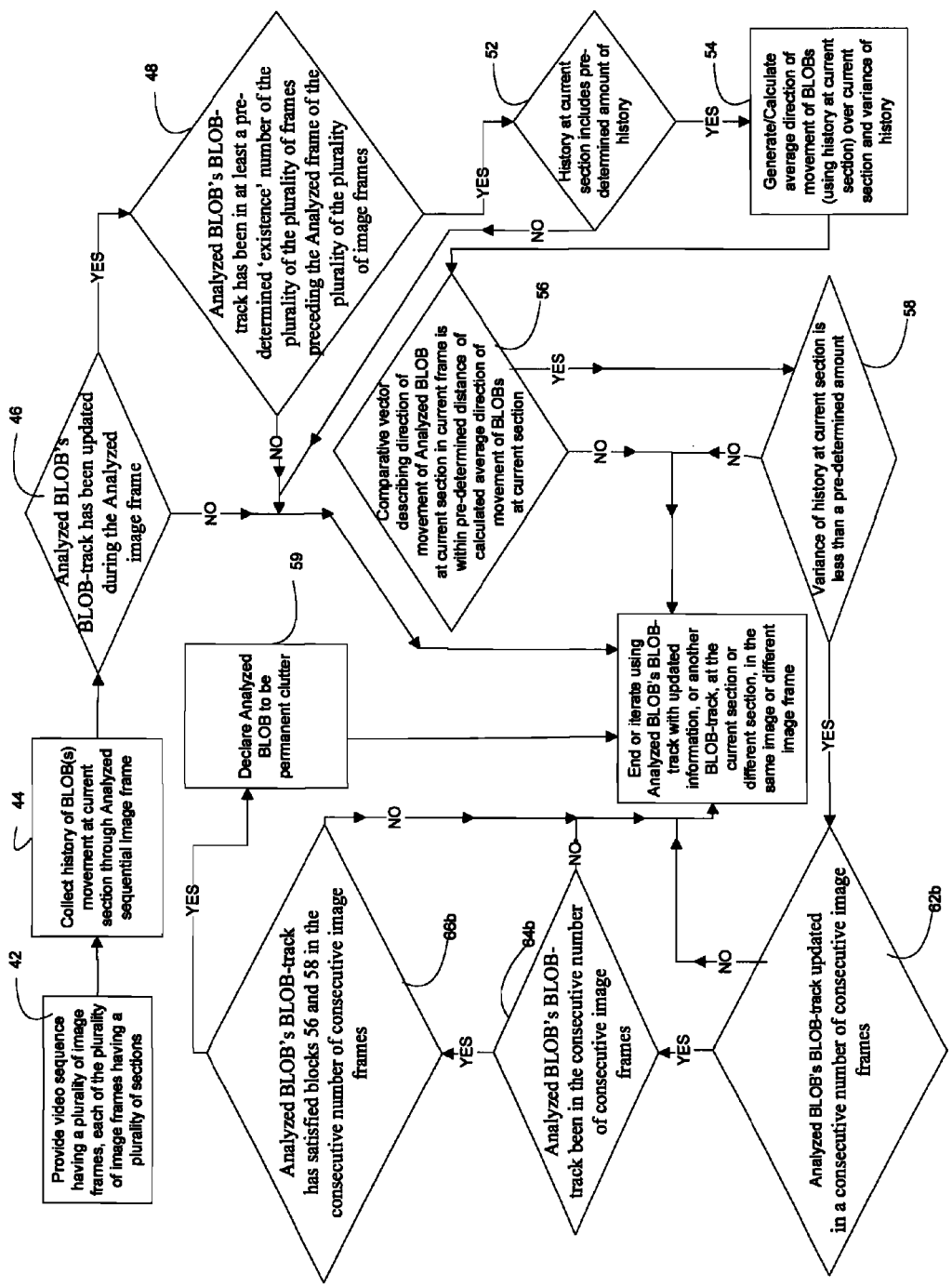
FIG. 8 is a high level flow chart of an embodiment of the invention in which a BLOB is declared clutter when, over the course of a plurality of image frames, the BLOB passes over a section of an image in a direction that is sufficiently similar to the direction of a history of the movement of BLOB(s) at the section and the variance of movement of BLOB(s) at the section is within a pre-determined amount according to embodiments of the invention.

With reference to FIG. 8, in yet others of these embodiments, the Analyzed BLOB is not declared to be permanent clutter 59 until each of the following has been determined to have occurred (so some of these embodiments include declaring the BLOB to be permanent clutter when):

the Analyzed BLOB's BLOB-track has been updated during a pre-determined 'consecutive' number of consecutive sequential image frames of the plurality of the plurality of sequential frames preceding the currently analyzed image frame of the plurality of the plurality of sequential image frames 62*b;* the BLOB-track has been in at least an pre-determined consecutive number of consecutive sequential image frames of the plurality of the plurality of sequential frames preceding the currently analyzed image frame of the plurality of the plurality of sequential image frames 64*b;* a comparative vector describing the direction of movement of the Analyzed BLOB at the one of the at least one of the plurality of sections is within a predetermined distance of the mean of the plurality of base unit vectors in each of the consecutive number of consecutive sequential image frames of the plurality of the plurality of sequential frames preceding the currently analyzed image frame of the plurality of the plurality of sequential image frames 66*b*; and the variance is less than a pre-determined amount in each of the consecutive number of consecutive sequential image frames of the plurality of the plurality of sequential frames preceding the currently analyzed image frame of the plurality of the plurality of sequential image frames 66*b.*

Additional Exemplary Embodiments Section 4: These embodiments are implemented as method(s), and/or plurality of machine executable instructions (accessed by the machine via an article of manufacture on which the instructions are stored) that (when executed by the machine) cause the processor to perform a method(s), described in this 'Additional Exemplary Embodiments Section 4'.

Once a BLOB is declared to be permanent clutter, the BLOB (and its track) is not passed on to subsequent systems that do not analyze objects determined to be background clutter; declaring a BLOB to be permanent clutter represents taking an action with respect to the BLOB that is consistent with the BLOB being an object not of interest, such as, for example, taking an action (for example processing the BLOB by flagging it) that prevents the permanent-clutter-declared BLOB from being passed on to subsequent system(s) that are not intended to analyze objects determined to be background clutter.

Figure 9:
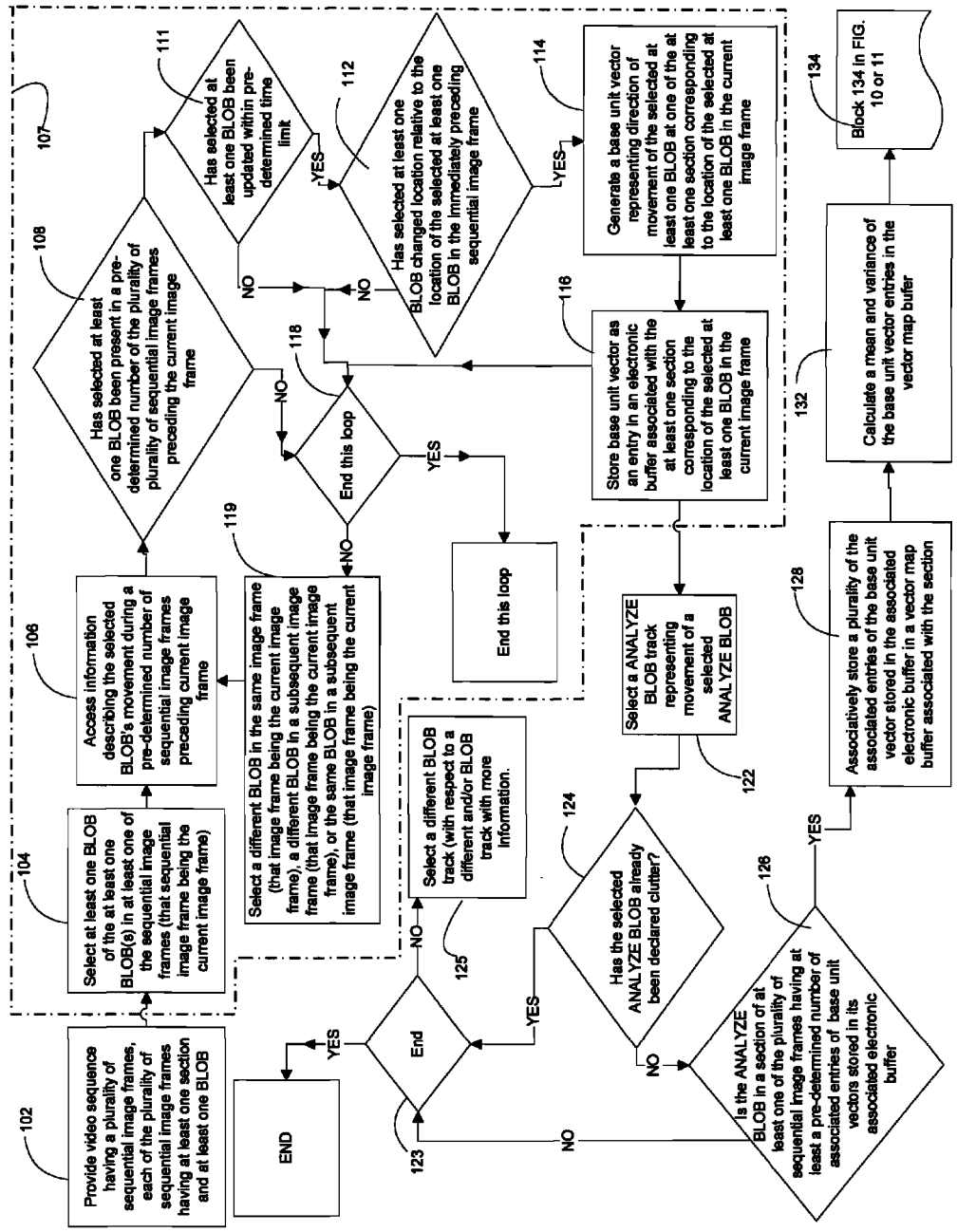
FIG. 9 is a high level flow chart of part of an embodiment of the invention depicted in tandem with either FIG. 10 or FIG. 11 according to embodiments of the invention.

With reference to FIG. 9, these embodiments include providing a video sequence having a plurality of sequential image frames 102, each of the plurality of sequential image frames having at least one section, a plurality of the plurality of sequential image frames having at least one BLOB therein.

These embodiments further include selecting at least one BLOB of the at least one BLOB(s) located in a selected of the at least one of the plurality of the plurality of sequential image frames 104 and accessing information describing the selected BLOB's movement during a pre-determined number of the plurality of the plurality of sequential image frames preceding the selected image frame of the plurality of plurality of sequential image frames 106.

These embodiments further include analyzing the accessed information associated with the selected BLOB of the at least one BLOB(s) to determine whether the selected BLOB: 1) has been present in a pre-determined number of the plurality of the plurality of sequential image frames 108; 2) has been updated within a predetermined time limit 111; and 3) has changed location relative to the location of the selected BLOB of the at least one BLOB(s) in a sequential image frame (of the plurality of the plurality of sequential image frames) immediately preceding the selected of the at least one of the plurality of the plurality of sequential image frames 112, and:

when 1, 2, and 3 above have occurred (in any order) for the selected BLOB of the at least one BLOB(s):

generating a base unit vector representing direction of movement of the selected BLOB of the at least one BLOB(s) at one of the at least one section corresponding to the location (of a pre-determined point) of the selected BLOB of the at least one BLOB(s) in the selected of the plurality of the plurality of sequential image frames 114;

storing the base unit vector as an entry in an electronic buffer associated with the one of the at least one section 116.

As shown in FIG. 9, the method involves determining whether to end the loop marked by the dashed line designated using reference number 107 when either: block 108, 111, or 112 is negative; and/or block 116 has been completed. When loop 107 is not determined to end (determination process represented by decision diamond 118), the method includes iterating through loop 107 (beginning with block 119) using the image frame of the plurality of the plurality of sequential image frames, and BLOB therein, selected during performance of block 119 during the then-current iteration of loop 107. Performance of block 119 includes either selecting a different BLOB (different from 'selected' BLOB selected in previous iteration of loop 107 beginning with block 119—or block 106 when the then-current iteration is the iteration that next follows the initial iteration) in the same sequential image frame, a different BLOB (different from 'selected' BLOB selected in previous iteration of loop 107 beginning with block 119—or block 106 when the then-current iteration is the iteration that next follows the initial iteration) in a selected sequential image frame that is subsequent to 'selected' sequential image frame selected in the previous iteration of loop 107 beginning with block 119 (or block 106 when the then-current iteration is the iteration that next follows the initial iteration), or the same BLOB in a selected sequential image frame that is subsequent to 'selected' sequential image frame selected in the previous iteration of loop 107 beginning with block 119 (or block 106 when the then-current iteration is the iteration that next follows the initial iteration)

These embodiments further include, for each of at least one BLOB tracks and for a plurality of the plurality of sequential image frames, selecting an ANALYZE BLOB track of the at least one BLOB tracks 122, (the selected ANALYZE BLOB track corresponding to a selected ANALYZE BLOB located in an ANALYZE image frame of the plurality of plurality of image frames) and analyzing the ANALYZE BLOB track with respect to the ANALYZE image frame to determine whether: the selected ANALYZE BLOB has already been declared clutter 124; and the selected ANALYZE BLOB is located in a THRESHOLD section of the at least one sections (of the ANALYZE image frame) that has at least a pre-determined number of associated entries of the base unit vector stored in its associated electronic buffer 126, and:

when the selected ANALYZE BLOB has not been declared CLUTTER and it is located in a THRESHOLD section of the at least one sections (of the ANALYZE image frame) that has at least the pre-determined number of associated entries of the base unit vector stored in its associated electronic buffer:

associatively storing a plurality of the associated entries of the base unit vector stored in the associated electronic buffer in a vector map buffer associated with the THRESHOLD section of the at least one sections (of the ANALYZE image frame) 128;

b: (in some embodiments) determining whether a total number of base unit vector entries in the vector map buffer exceeds a pre-determined number of entries; and calculating a mean and variance of the base unit vector entries in the vector map buffer associated with the THRSHOLD SECTION of the at least one sections (of the ANALYZE image frame) 132 (in embodiments in which b is performed, mean and variance not calculated until the total number of base unit vector entries in the vector map buffer exceeds the pre-determined number of entries).

Note that in some embodiments, as shown in FIG. 9, when the selected ANALYZE BLOB has been declared clutter AND/OR it is not located in a THRESHOLD section of the at least one sections (of the ANALYZE image frame) that has at least the pre-determined number of associated entries of the base unit vector stored in its associated electronic buffer, the method includes determining whether to end 123. When it is determined not to end, the method proceeds by either: updating the selected ANALYZE BLOB track with additional and/or different information 125 and iterating through the loop to block beginning with 125 to analyze the updated selected ANALYZE BLOB located in an ANALYZE image frame with respect to which the ANALYZE BLOB has not been analyzed; OR selecting the selected ANALYZE BLOB of the then-current iteration of the loop beginning with block 125 to be a different BLOB of the at least one BLOB(s) than the selected ANALYZE BLOB of the immediately preceding iteration of the loop beginning with block 125; the ANALYZE image frame with respect to which the selected ANALYZE BLOB is analyzed can be the same ANALYZE image frame as the ANALYZE image frame with respect to which the selected ANALYZE BLOB analyzed in the iteration of the loop immediately preceding the then current iteration of the loop was analyzed, or it can be different.

Figure 10:
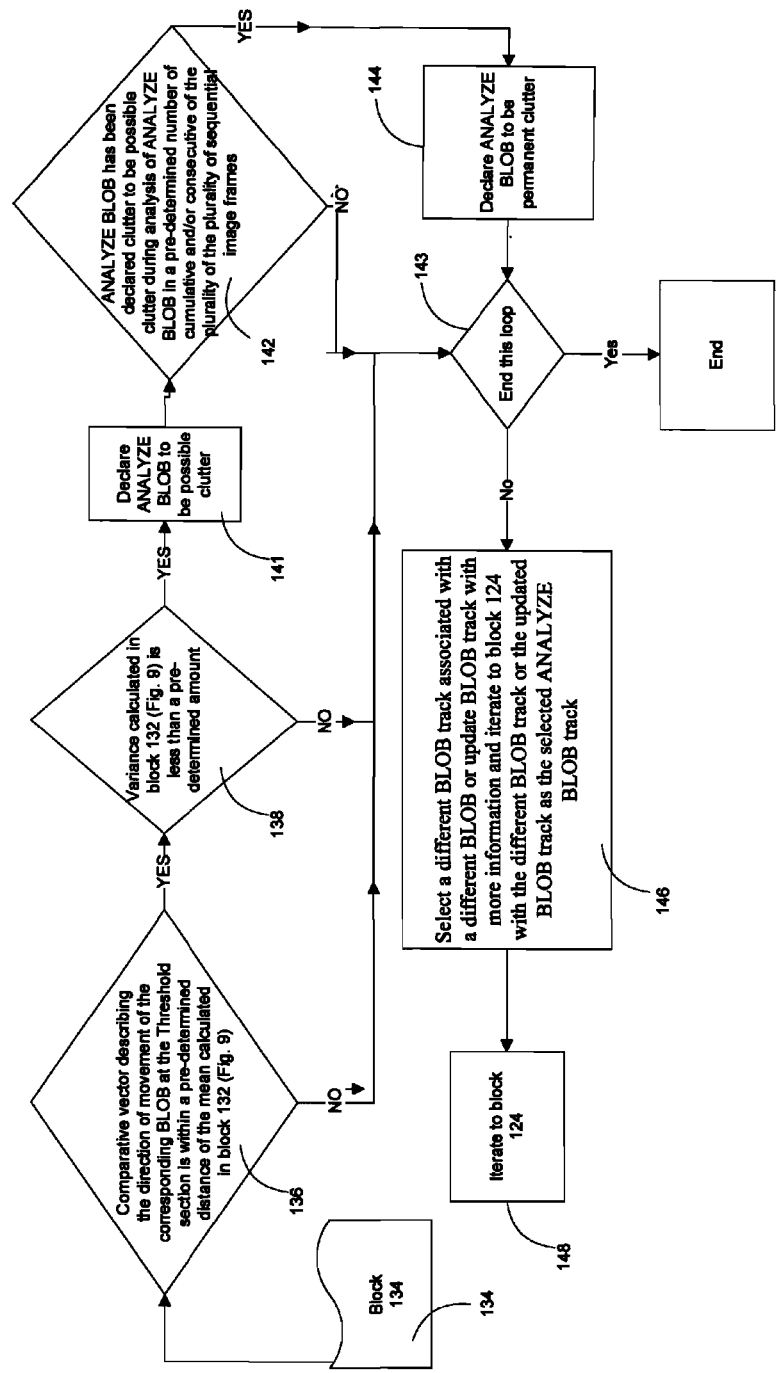
FIG. 10 is a high level flow chart of part of an embodiment of the invention depicted in tandem with FIG. 9 according to embodiments of the invention.
Figure 11:
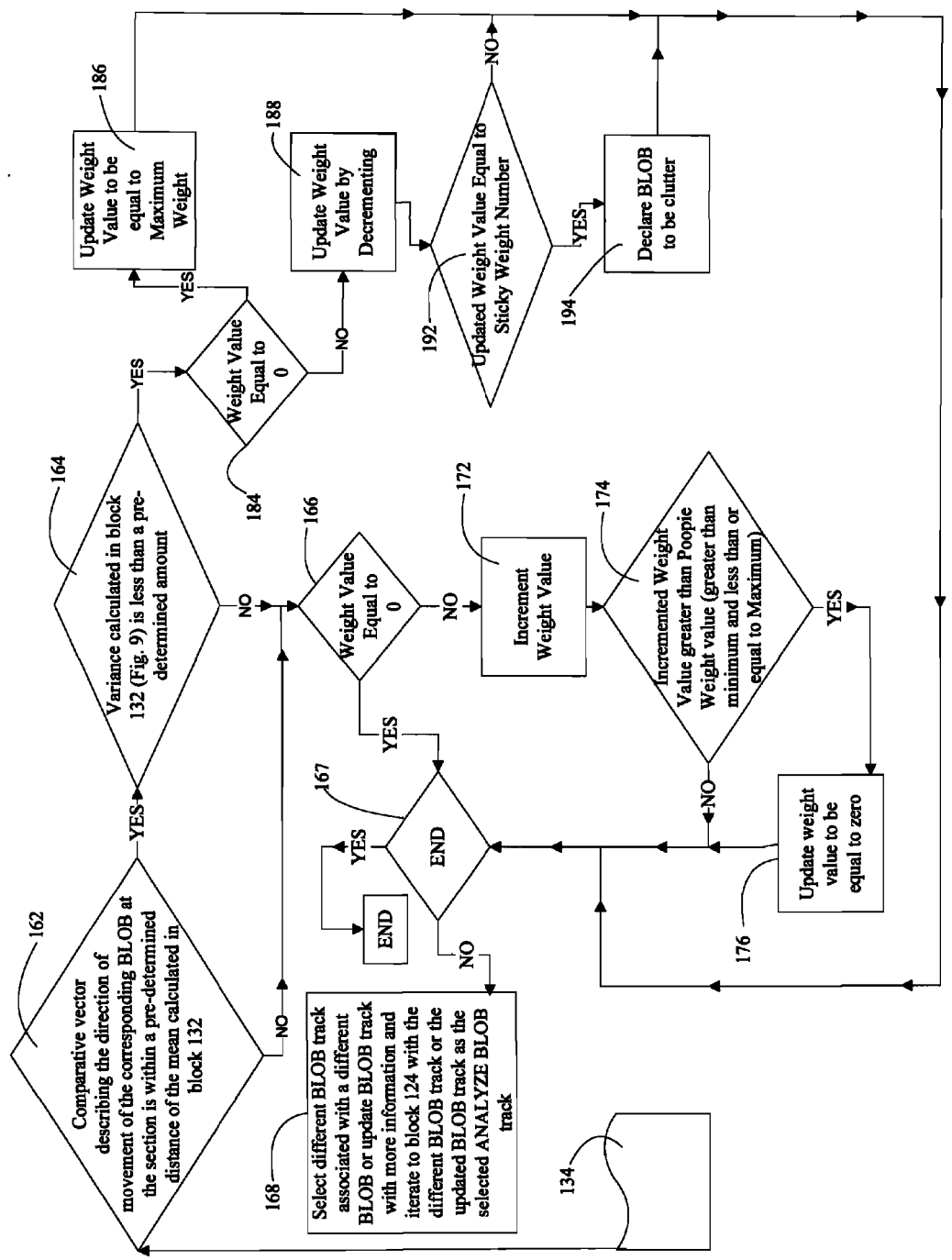
FIG. 11 is a high level flow chart of part of an embodiment of the invention depicted in tandem with FIG. 9 according to embodiments of the invention.

These embodiments further include proceeding to Block 134 in either FIG. 10 or 11.

With reference to FIG. 10, some of these embodiments further include declaring the selected ANALYZE BLOB to be possible clutter 141 when:

a comparative vector describing the direction of movement of the selected ANALYZE BLOB at an area of the ANA-LYZE sequential image frame is within a predetermined distance of the calculated mean 136; and the calculated variance of the THRESHOLD section is less than a pre-determined amount 138.

Some of these embodiments further include declaring the selected ANALYZE BLOB to be permanent clutter 144 when ANALYZE BLOB has been declared to be possible clutter during analysis of ANALYZE BLOB in a pre-determined number of cumulative and/or consecutive of the plurality of the plurality of sequential image frames 142.

As shown in FIG. 10, when any of blocks 136, 138, or 142 is negative, the method involves determining whether to end 143. When the method does not end, the method proceeds by either: updating the selected ANALYZE BLOB track with additional and/or different information 146 and iterating through the loop beginning with block 146 to analyze the updated selected ANALYZE BLOB located in an ANALYZE image frame with respect to which the ANALYZE BLOB has not been analyzed; OR selecting the selected ANALYZE BLOB of the then-current iteration of the loop beginning with block 146 to be a different BLOB of the at least one BLOB(s) than the selected ANALYZE BLOB of the immediately preceding iteration of the loop beginning with block 146; the ANALYZE image frame with respect to which the selected ANALYZE BLOB is analyzed can be the same ANALYZE image frame as the ANALYZE image frame with respect to which the selected ANALYZE BLOB analyzed in the iteration of the loop immediately preceding the then current iteration of the loop was analyzed, or it can be different.

Also as shown in FIG. 10, when a BLOB is determined to be permanent clutter 144, the method involves determining whether to end 143. When the method does not end, the method proceeds by either: updating the selected ANALYZE BLOB track with additional and/or different information 146 and iterating through the loop beginning with block 146 to analyze the updated selected ANALYZE BLOB located in an ANALYZE image frame with respect to which the ANALYZE BLOB has not been analyzed; OR selecting the selected ANALYZE BLOB of the then-current iteration of the loop beginning with block 146 to be a different BLOB of the at least one BLOB(s) than the selected ANALYZE BLOB of the immediately preceding iteration of the loop beginning with block 146; the ANALYZE image frame with respect to which the selected ANALYZE BLOB is analyzed can be the same ANALYZE image frame as the ANALYZE image frame with respect to which the selected ANALYZE BLOB analyzed in the iteration of the loop immediately preceding the then current iteration of the loop was analyzed, or it can be different.

With reference to FIG. 11, in some of these embodiments, each of the ANALYZE BLOB tracks have an associated weight value (they are initialized to a value and updated as described herein). In some of these embodiments, the method includes updating the associated weight value during a plurality of the plurality of iterations according to the following method:

determining: whether a comparative vector describing the direction of movement of the selected ANALYZE BLOB at THRESHOLD section of the ANALYZE image frame is within a predetermined distance of the calculated mean at THRESHOLD section 162; and the calculated variance at THRESHOLD section is less than a pre-determined amount 164, and:

when either: the comparative vector describing the direction of movement of the selected ANALYZE BLOB at THRESHOLD section of the ANALYZE image frame is not within a predetermined distance of the calculated mean at THRESHOLD section; or the calculated variance at THRESHOLD section is not less than a pre-determined amount:
  determining whether the weight value of selected ANALYZE BLOB is equal to zero 166, and:
    when the weight value of selected ANALYZE BLOB, determining whether to end 167, and
      when not determined to end, either: updating the selected ANALYZE BLOB track with additional and/or different information and iterating through the loop beginning with block 168 to analyze the updated selected ANALYZE BLOB located in an ANALYZE image frame with respect to which the ANALYZE BLOB has not been analyzed; OR selecting the selected ANALYZE BLOB of the then-current iteration of the loop beginning with block 168 to be a different BLOB of the at least one BLOB(s) than the selected ANALYZE BLOB of the immediately preceding iteration of the loop beginning with block 168; in this option, the ANALYZE image frame with respect to which the selected ANALYZE BLOB is analyzed can be the same ANALYZE image frame as the ANALYZE image frame with respect to which the selected ANALYZE BLOB analyzed in the iteration of the loop immediately preceding the then current iteration of the loop was analyzed, or it can be different;
  when the weight value of selected ANALYZE BLOB is not equal to zero, updating the weight value by of selected ANALYZE BLOB by incrementing the weight value 172 and:
    determining whether the incremented weight value is greater than the maximum value 174, and:
      when the incremented weight value is not greater than a pre-determined junk weight ('junk weight' being greater than the minimum - initialized value - and less than or equal to maximum value used in block 186), determining whether to end 167, and:
        when not determined to end, selecting a different BLOB track associated with a different BLOB or updating the BLOB track with more information and iterating to block 124 with the different BLOB track or the updated BLOB track as the selected BLOB track 168; and
      when the weight value incremented during analysis of the currently-analyzed sequential image frame is greater than the current level, updating the current weight value to be equal to zero 176 and determining whether to end 167, and:
        when not end, either:
        1) updating the selected ANALYZE BLOB track with additional and/or different information and iterating through the loop beginning with block 168 to analyze the updated selected ANALYZE BLOB located in an ANALYZE image frame with respect to which the ANALYZE BLOB has not been analyzed; OR 2) selecting the selected ANALYZE BLOB of the then-current iteration of the loop beginning with block 168 to be a different BLOB of the at least one BLOB(s) than the selected ANALYZE BLOB of the immediately preceding iteration of the loop beginning with block 168; in this option, the ANALYZE image frame with respect to which the selected ANALYZE BLOB is analyzed can be the same ANALYZE image frame as the ANALYZE image frame with respect to which the selected ANALYZE BLOB analyzed in the iteration of the loop immediately preceding the then current iteration of the loop was analyzed, or it can be different;
when both: the comparative vector describing the direction of movement of the selected ANALYZE BLOB at THRESHOLD section of the ANALYZE image frame is within a predetermined distance of the calculated mean at THRESHOLD section; and the calculated variance at THRESHOLD section is less than a pre-determined amount:
  determining whether the weight value of selected ANALYZE BLOB is equal to zero 184, and:
    when the weight value is equal to zero, updating the weight value to be equal to a pre-determined Maximum weight value 186, (the pre-determined Maximum weight value being greater than a sticky weight value, the sticky weight value being greater than a minimum weight value, the minimum weight value being the weight value to which each of the BLOB TRACKs is initialized) and determining whether to end 167, and:
      when not determined to end, either: updating the selected ANALYZE BLOB track with additional and/or different information and iterating through the loop beginning with block 168 to analyze the updated selected ANALYZE BLOB located in an ANALYZE image frame with
respect to which the ANALYZE
BLOB has not been analyzed; OR
selecting the selected ANALYZE
BLOB of the then-current
iteration of the loop beginning
with block 168 to be a different
BLOB of the at least one BLOB(s)
than the selected ANALYZE BLOB
of the immediately preceding
iteration of the loop beginning
with block 168; in this option,
the ANALYZE image frame with
respect to which the selected
ANALYZE BLOB is analyzed can be
the same ANALYZE image frame as
the ANALYZE image frame with
respect to which the selected
ANALYZE BLOB analyzed in the
iteration of the loop
immediately preceding the then
current iteration of the loop
was analyzed, or it can be
different;
when the weight value of selected
ANALYZE BLOB is not equal to zero,
updating the weight value by
decrementing the weight value 188 and
determining whether the updated
(decremented) weight value is equal
to the pre-determined sticky weight
number 192 and:
    when updated weight value is not
    equal to the pre-determined
    sticky weight number,
    determining whether to end 167,
    and:
        when not determined to end,
        either: updating the
        selected ANALYZE BLOB track
        with additional and/or
        different information and
        iterating through the loop
        beginning with block 168 to
        analyze the updated
        selected ANALYZE BLOB
        located in an ANALYZE image
        frame with respect to which
        the ANALYZE BLOB has not
        been analyzed; OR selecting
        the selected ANALYZE BLOB
        of the then-current
        iteration of the loop
        beginning with block 168 to
        be a different BLOB of the
        at least one BLOB(s) than
        the selected ANALYZE BLOB
        of the immediately
        preceding iteration of the
        loop beginning with block
        168; in this option, the
        ANALYZE image frame with
        respect to which the
        selected ANALYZE BLOB is
        analyzed can be the same
        ANALYZE image frame as the
        ANALYZE image frame with
        respect to which the
        selected ANALYZE BLOB
        analyzed in the iteration
        of the loop immediately
        preceding the then current
        iteration of the loop was
        analyzed, or it can be
        different;
    when updated weight value is
    equal to sticky weight number,
    declaring BLOB to be clutter 194
    and determining whether to end
    167, and:
        when not determined to end,
        either: updating the
        selected ANALYZE BLOB track
        with additional and/or
        different information and
        iterating through the loop
        beginning with block 168 to
        analyze the updated
        selected ANALYZE BLOB
        located in an ANALYZE image
        frame with respect to which
        the ANALYZE BLOB has not
        been analyzed; OR selecting
        the selected ANALYZE BLOB
        of the then-current
        iteration of the loop
        beginning with block 168 to
        be a different BLOB of the
        at least one BLOB(s) than
        the selected ANALYZE BLOB
        of the immediately
        preceding iteration of the
        loop beginning with block
        168; in this option, the
        ANALYZE image frame with
        respect to which the
        selected ANALYZE BLOB is
        analyzed can be the same
        ANALYZE image frame as the
        ANALYZE image frame with
        respect to which the
        selected ANALYZE BLOB
        analyzed in the iteration
        of the loop immediately
        preceding the then current
        iteration of the loop was
        analyzed, or it can be
        different.

Additional Exemplary Embodiments Section 5: These embodiments are implemented as method(s), and/or plurality of machine executable instructions (accessed by the machine via an article of manufacture on which the instructions are stored) that (when executed by the machine) cause the processor to perform a method(s), described in this 'Additional Exemplary Embodiments Section 5'. An implementation of these embodiments will be described with reference to two blocks: an embodiment of a vector updating algorithm illustrated in FIG. 12; and an embodiment of a vector masking track weighting algorithm illustrated in FIG. 13.

Once a BLOB is declared to be permanent clutter, the BLOB (and its track) is not passed on to subsequent systems that do not analyze objects determined to be background clutter; declaring a BLOB to be permanent clutter represents taking an action with respect to the BLOB that is consistent with the BLOB being an object not of interest, such as, for example, taking an action (for example processing the BLOB by flagging it) that prevents the permanent-clutter-declared BLOB from being passed on to subsequent system(s) that are not intended to analyze objects determined to be background clutter.

Figure 12:
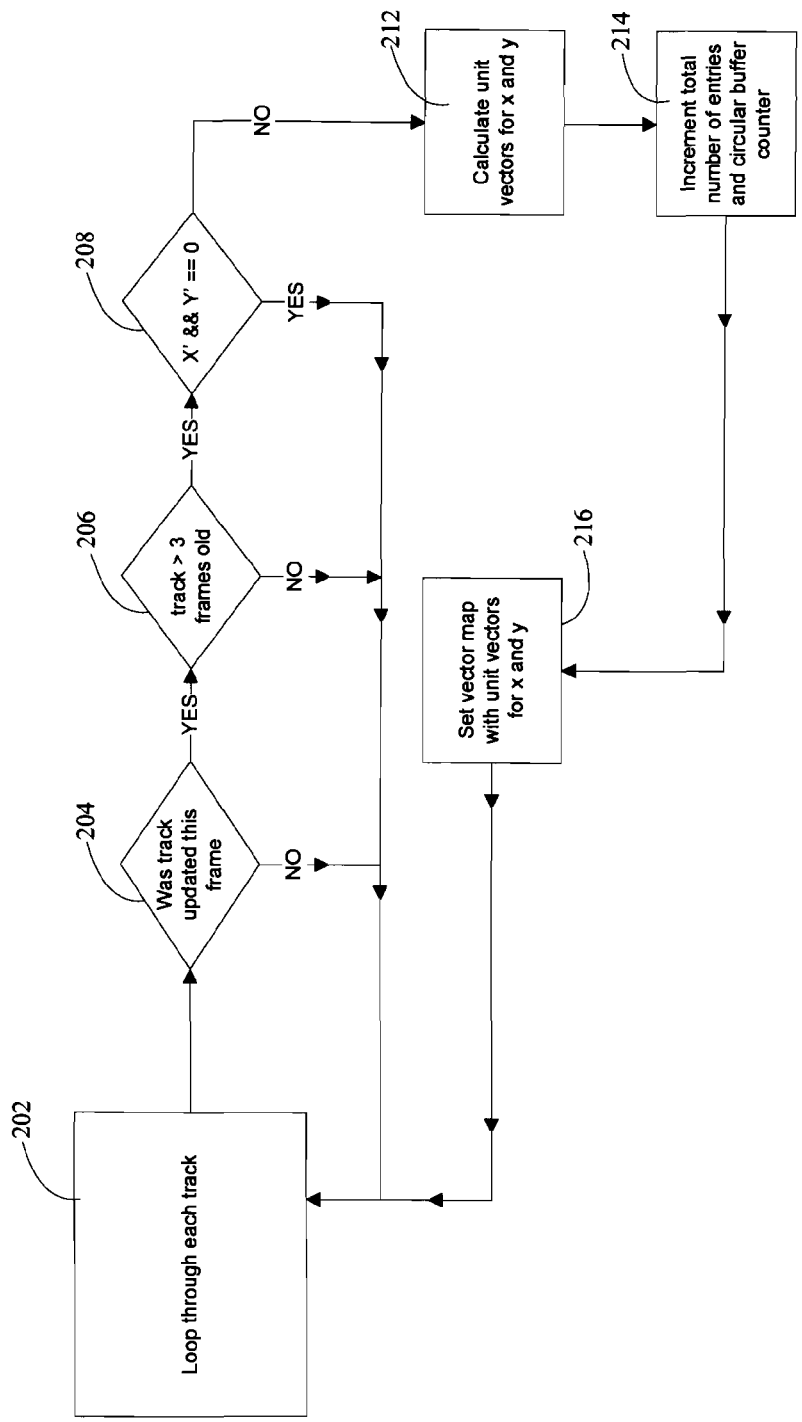
FIG. 12 is a flowchart of an embodiment of a vector updating algorithm.

With reference to FIG. 12, these embodiments of a vector updating algorithm first loops through each of the existing BLOB tracks as passed in by an image tracking algorithm. Any known tracking algorithm that generates the input information (as defined herein) will do; also, note that embodiments of the invention may also be applied to any multidimensional system where time and positional data is known for multiple moving objects, such as with GPS sensors—where the time and positional data is definite as opposed to relative.

The method includes determining whether the current BLOB track was updated this frame 204. When the current track was not updated this frame, then the loop continues on to the next track. Otherwise, the BLOB track is tested to determine whether the BLOB track contains a specified number of frames of history. In some embodiments, (such as the one illustrated in FIG. 12), the number of frames of history required to move to block 206 is 3; however, in other embodiments, the number of frames of history can be more or less than three. When the BLOB track does not include the minimum pre-determined number of frames of history, then the BLOB track is currently unreliable, and the loop continues to the next track. Otherwise, the BLOB track is analyzed to determine whether it has moved (x' & Y'=0 decision block) since it was last analyzed (or within a predetermined time limit) 208.

When the BLOB track is stationary, the loop continues to the next BLOB track. Otherwise, a unit vector describing the motion of the BLOB track is calculated from the track statistics 212. The circular buffer for the pixel at which the BLOB represented by the BLOB track is over in the sequential image frame being analyzed is then updated with the unit vector information, and the circular buffer increments to the next slot in the buffer 214. The total number of entries found on the pixel are then updated 214. The vector map buffer is loaded with a pre-determined number of circular buffer entries for the pixel 216.

Figure 13:
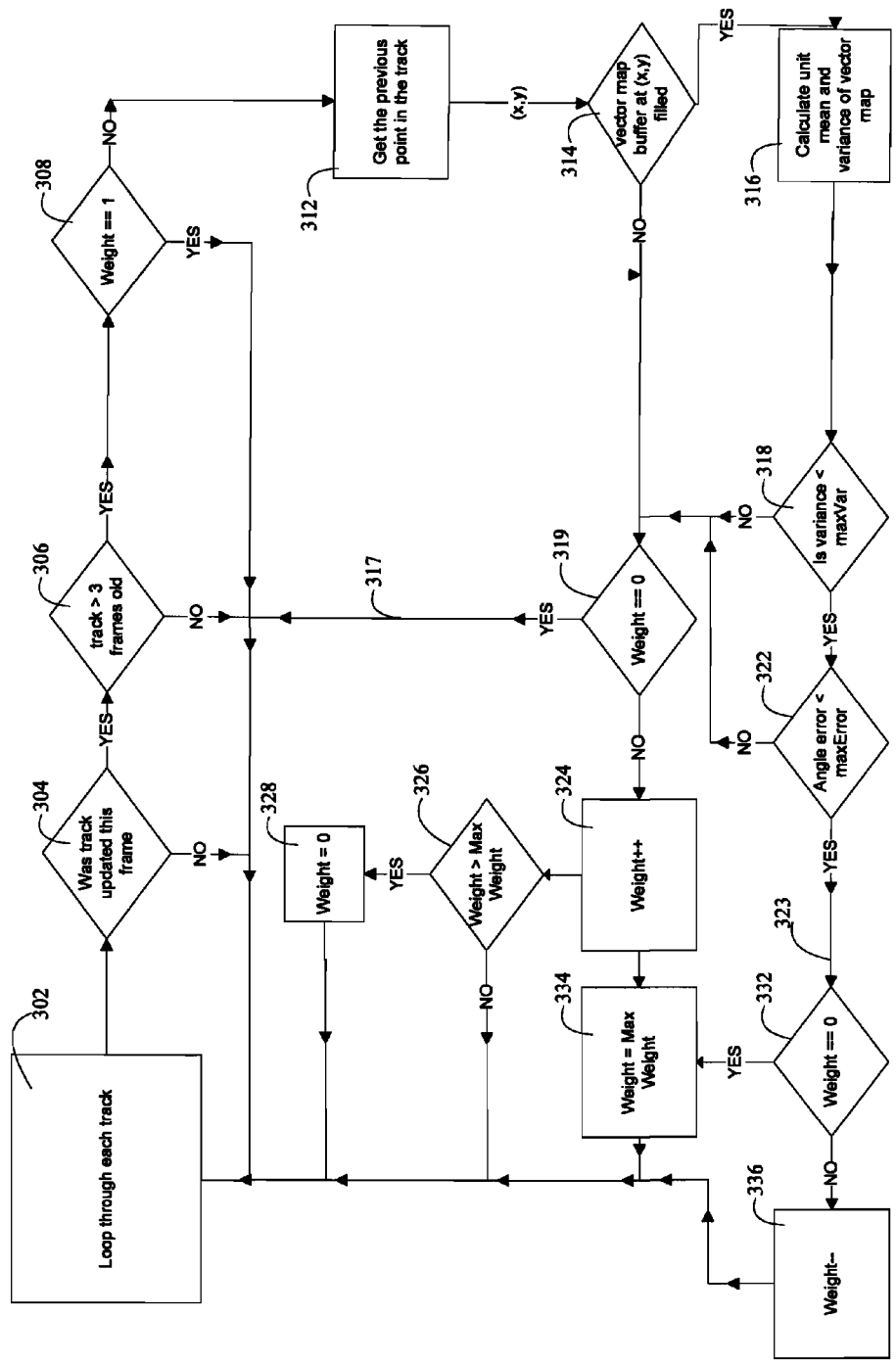
FIG. 13 is a flowchart of an embodiment of a vector masking track weighting algorithm.

With reference to FIG. 13, these embodiments of a vector mask track weighting algorithm loop through at least one BLOB track having a tracking history associated with a particular pixel; in some embodiments the vector mask track weighting algorithm loops through a plurality of tracks.

The current BLOB track is analyzed to determine whether it was updated for the current sequential image frame 304. When the current BLOB track was not updated for the current sequential image frame, the process continues to the next BLOB track. When the current BLOB track was updated for the current sequential image frame, the BLOB track is analyzed to determine whether it includes enough of a history to get a reliable movement vector 306 (in some embodiments, this is determined by comparing the number of frames in which the track is present). When the current BLOB track is not determined to include enough history to get a reliable movement vector, the process continues to the next BLOB track. When the current BLOB track is determined to include enough history to get a reliable movement vector, the BLOB represented by the BLOB track is analyzed to determine whether it has already been declared to be clutter 308 by comparing the weight value assigned with the BLOB/BLOB track to the pre-determined sticky-weight value; when the weight value of the current BLOB track is equal to the sticky weight value, then the BLOB is determined to have already been declared clutter and the process continues to the next BLOB track.

When the BLOB represented by the current BLOB track has not been previously declared cutter, the point in the track which was previous to the most current point in the track is fetched from the tracking algorithm and an angle of movement of the BLOB (at a particular pixel) is calculated (this is the comparative vector described above) 312.

The vector mask array for the current pixel (which was established as above) is accessed and analyzed to determine whether it has a pre-determined number of entries 314. When this pixel doesn't have the required amount of entries, then the algorithm continues on to the next track. When the pixel has the required amount of entries, then the mean and variance of the unit vectors are calculated and the mean is converted to unit vectors 316.

The mean 322 and/or variance 318 are analyzed. When either the mean of the history deviates a pre-determined amount (or more) from the unit vector of the motion of the current track, OR the variance of the history at the pixel is too high, then the weight of the track is decremented as follows:

When the current weighting is at its minimum (determination process represented by decision diamond 319) (the initialized weight value), then the loop continues (as shown with connector line 317).

When the current weighting is NOT at its minimum (determination process represented by decision diamond 319), the weight increments by one increment 324;
the incremented weight is compared to a maximum value 326, and
When the incremented weight is above a given number, then the weight is returned to zero 328.
When the incremented weight is below a given number, then the loop continues.

When the mean of the history (mean of the unit vectors calculated in block 316) deviates less than a pre-determined amount from the comparative vector (calculated in block 312) of the motion of the current track, and the variance of the history at the pixel is too high (calculated in block, 316), the algorithm proceeds (as illustrated using connector line 323) as follows:

the weight value is analyzed to determine whether it is at its minumum 332, and:
When the weight is currently at its minimum:
the weight is set to a Maximum value 334;
The loop then continues.
When the weight is at a value which is greater than the minimum (the value at which the BLOB track's weight is initialized), then the weight is decremented by a single pre-determined increment value, and the loop continues 336.

Once a BLOB has a weight value that equals the sticky weight value (value of 1 in the illustrated embodiment), then it is stuck at that particular weight and will always be considered clutter.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A non-transitory machine readable medium having stored thereon a plurality of machine executable instructions that, when executed by said machine, cause said machine to perform a method, comprising:
providing a video sequence wherein said video sequence comprises a plurality of sequential image frames, each of said plurality of sequential image frames including at least one BLOB and at least one section;
collecting a history of the direction of movement of a pre-determined point of at least one of said at least one BLOB over said at least one of said at least one section of a sequential image frame of said plurality of sequential image frames, for at least one of said at least one section;
generating a plurality of base unit vectors associated with said at least one of said at least one section when said collected history includes at least a pre-determined amount of history, said set of base unit vectors representing direction of movement at said at least one of said at least one section of each of said at least one BLOB having a predetermined point that passes over said at least one of said at least one section; and declaring a First BLOB to be clutter when a predetermined point on said First BLOB passes over said at least one of said at least one section after said plurality of base unit vectors has been generated, and
a comparative vector describing the direction of movement of said First BLOB at said at least one of said at least one section is within a predetermined distance of the mean of said plurality of base unit vectors associated with said at least one of said at least one section; and
variance of said plurality of base unit vectors associated with said at least one of said at least one section is less than a pre-determined amount.

2. A non-transitory machine readable medium having stored thereon a plurality of machine executable instructions that, when executed by said machine, cause said machine to per coral a method comprising:

providing a video sequence having a plurality of sequential image frames, each of said plurality of sequential image frames having a plurality of sections;

collecting a history of the direction of movement of at least one BLOB over a plurality of said plurality of sections, for a plurality of said plurality of sequential image frames;

generating a plurality of base unit vectors associated with one of said plurality of said plurality of sections when said collected history includes at least a pre-determined amount of history, said plurality of base unit vectors associated with said one of said plurality of said plurality of sections representing direction of movement, at said at one of said plurality of said plurality of sections with which said plurality of base unit vectors is associated, of each of said at least one BLOB having a predetermined point that passes over said one of said plurality of sections;

identifying a First BLOB as possible clutter when a predetermined point on said First BLOB passes over at least one of said plurality of sections having an associated plurality of base unit vectors and;
a comparative vector describing the direction of movement of said First BLOB at said at least one of said plurality of sections having said associated plurality of base unit vectors is within a predetermined distance of the mean of said plurality of base unit vectors associated with said at least one of said plurality of sections; and
variance of said plurality of base unit vectors associated with said at least one of said plurality of sections is less than a pre-determined amount.

3. The machine readable medium of claim 2, said method further comprising declaring said First BLOB to be permanent clutter when a BLOB-track representing the movement of said First BLOB has been updated in at least an updating pre-determined number of said plurality of said plurality of sequential image frames.

4. The machine readable medium of claim 2, said method further comprising declaring said First BLOB to be permanent clutter when a BLOB-track representing the movement of said First BLOB has been updated in at least an updating pre-determined number of said plurality of said plurality of sequential image frames; wherein said comparative vector describing the direction of movement of said First BLOB at said at least one of said plurality of sections having said associated plurality of base unit vectors is within said predetermined distance of the mean of said plurality of base unit vectors associated with said at least one of said plurality of sections; and variance of said plurality of base unit vectors associated with said at least one of said plurality of sections is less than a pre-determined amount.

5. The machine readable medium of claim 2, said method further comprising declaring said First BLOB to be permanent clutter when a BLOB-track representing the movement of said First BLOB has been updated in at least an consecutive updating pre-determined number of consecutive sequential image frames of said plurality of said plurality of sequential image frames; wherein said comparative vector describing the direction of movement of said First BLOB at said at least one of said plurality of sections having said associated plurality of base unit vectors is within said predetermined distance of the mean of said plurality of base unit vectors associated with said at least one of said plurality of sections; and variance of said plurality of base unit vectors associated with said at east one of said plurality of sections is less than pre-determined amount.

6. The machine readable medium of claim 2 wherein said First BLOB is declared to be permanent clutter.

7. A non-transitory machine readable medium having stored thereon a plurality of machine executable instructions that, when executed by said machine, cause said machine to perform a method comprising:

providing a video sequence having a plurality of sequential image frames, each of said plurality of sequential image frames having a plurality of sections;

collecting a history of the direction of movement of at least one BLOB over a plurality of said plurality of sections, for a plurality of said plurality of sequential image frames;

generating a mean and variance of a plurality of base unit vectors associated with one of said plurality of said plurality of sections representing direction of movement, at said at one of said plurality of said plurality of sections with which said plurality of base unit vectors is associated, of each of said at least one BLOB having a predetermined point that passes over said one of said plurality of sections when a BLOB-track has been updated during a currently analyzed of said plurality of said plurality of sequential image frames, said BLOB-track representing movement of an analyzed BLOB that is located in a currently analyzed of said plurality of said plurality of sequential image frames and in an area of said currently analyzed of said plurality of said plurality of sequential image frames corresponding to the location of said one of said plurality of said plurality of sections in said currently analyzed of said plurality of said plurality of sequential image frames;

said BLOB-track has been in at least an pre-determined existence number of said plurality of said plurality of sequential image frames preceding said currently analyzed frame of said plurality of said plurality of sequential image frames; and said collected history of said one of said plurality of said plurality of sections includes at least a pro-determined amount of history.

8. The machine readable medium of claim 7, said method further comprising declaring a First BLOB to be clutter when:
   a comparative vector describing the direction of movement of said analyzed BLOB at said one of said plurality of said plurality of sections is within a predetermined distance of said mean of said plurality of base unit vectors; and
   said variance is less than a pre-determined amount.

9. The machine readable medium of claim 8 wherein declaring a First BLOB to be permanent clutter further comprises declaring a First BLOB to be permanent clutter when each of the following has been determined to have occurred;
   said BLOB-track has been updated during a threshold number of said plurality of said plurality of sequential image frames;
   said BLOB-track has been in at least an pre-determined existence number of said plurality of said plurality of sequential image frames preceding said currently analyzed frame of said plurality of said plurality of sequential image frames;
   a comparative vector describing the direction of movement of said analyzed BLOB at said one of said plurality of said plurality of sections is within a predetermined distance of said mean of said plurality of base unit vectors in each of said threshold number of said plurality of said plurality of sequential image frames; and
   said variance is less than a pre-determined amount in each of said threshold number of said plurality of said plurality of sequential image frames.

10. The machine readable medium of claim 8 wherein declaring a First BLOB to be permanent clutter further comprises declaring a First BLOB to be permanent clutter when each of the following has been determined to have occurred;
    said BLOB-track has been updated during a threshold number of consecutive sequential image frames of said plurality of said plurality of said plurality of sequential image frames;
    said BLOB-track has been in at least an pre-determined existence number of said plurality of said plurality of sequential image frames preceding said currently analyzed frame of said plurality of said plurality of sequential image frames;
    a comparative vector describing the direction of movement of said analyzed BLOB at said one of said plurality of said plurality of sections is within a predetermined distance of said mean of said plurality of base unit vectors in each of said threshold number of consecutive sequential image frames; and
said variance is less than a pre-determined amount in each of said threshold number of consecutive sequential image frames.

11. A non-transitory machine readable medium having stored thereon a plurality of machine executable instructions that, when executed by said machine, cause said machine to perform a method, comprising:
    providing a video sequence having a plurality of sequential image frames, each of said plurality of sequential image frames having at least one section, a plurality of said plurality of sequential image frames having at least one BLOB therein;
    selecting at least one BLOB of said at least one BLOB located in a selected of the at least one of the plurality of the plurality of sequential image frames;
    accessing information describing said selected at least one BLOB of said at least one BLOB;
    analyzing said accessed information to determine whether said selected at least one BLOB of said at least one BLOB: has been present in a pre-determined number of said plurality of said plurality of sequential image frames; has been updated within a predetermined time limit; and has changed location relative to the location of said at least one BLOB of said at least one BLOB in an sequential image frame of said plurality of said plurality of sequential image frames immediately preceding a currently analyzed sequential image frame of said plurality of said plurality of sequential image frames; and
    when said selected at least one BLOB has been present in a pre-determined number of said plurality of said plurality of sequential image frames; has been updated within a predetermined time limit; and has changed location relative to the location of said at least one BLOB of said at least one BLOB in an sequential image frame of said plurality of said plurality of sequential image frames immediately preceding a currently analyzed sequential image frame of said plurality of said plurality of sequential image frames,
       generating a base unit vector representing direction of movement of said selected at least one BLOB of said at least one BLOB at one of said at least one section corresponding to the location of said selected at least one BLOB of said at least one BLOB in said selected of said plurality of said plurality of sequential image frames; and
       storing said base unit vector as an entry in an electronic buffer associated with said one of said at least one section.

12. The machine readable medium of claim 11, said method further comprising:
    selecting an ANALYZE BLOB track of said at least one BLOB tracks, said ANALYZE BLOB track representing a selected ANALYZE BLOB located in an ANALYZE image frame of said plurality of said plurality of sequential image frames;
    analyzing said ANALYZE BLOB track with respect to said ANALYZE image frame to determine whether said selected ANALYZE BLOB has already been declared clutter, and said selected ANALYZE BLOB is located in a THRESHOLD section of said at least one sections of said ANALYZE image frame that has at least a pre-determined number of associated entries of said base unit vector stored in its associated electronic buffer; and
    when said selected ANALYZE BLOB has not yet been declared clutter and is located in a THRESHOLD section of said at least one sections, of said ANALYZE image frame, that has at least said pre-determined number of associated entries of said base unit vector stored in its associated electronic buffer;
       associatively storing a plurality of said associated entries of said base unit vector stored in said associated electronic buffer in a vector map buffer associated with said THRESHOLD section;
       determining whether a total number of base unit vector entries in said vector map buffer exceeds a pre-determined number of entries, and
          when said total number of base unit vector entries in said vector map buffer exceeds said pre-determined number of entries calculating a mean and variance of said base unit vector entries in said vector map buffer.

13. The machine readable medium of claim 12, said method further comprising:
    declaring said selected ANALYZE BLOB to be possible clutter when;

a comparative vector describing the direction of movement of said selected ANALYZE BLOB at said THRESHOLD section is within a predetermined distance of the calculated mean; and calculated variance of said THRESHOLD section is less than a pre-determined amount.

14. The machine readable medium of claim 13, said method further comprising declaring said selected ANALYZE BLOB to be permanent clutter when said selected ANALYZE BLOB has been declared to be possible clutter during, analysis of said selected ANALYZE BLOB in a predetermined number of cumulative of said plurality of said plurality of sequential image frames.

15. The machine readable medium of claim 14, said method further comprising declaring said selected ANALYZE BLOB to be permanent clutter when said selected ANALYZE BLOB has been declared to be possible clutter during analysis of said selected ANALYZE BLOB in a predetermined number of consecutive of said plurality of said plurality of sequential image frames.

16. The machine readable medium of claim 12 wherein each of said BLOB tracks have an associated weight value.

17. The machine readable medium of claim 16, said method further comprising updating said associated weight value by:

determining whether a comparative vector describing said direction of movement of said selected ANALYZE BLOB at said THRESHOLD section of said ANALYZE image frame is within a predetermined distance of said calculated mean at said THRESHOLD section; and said calculated variance at said THRESHOLD section is less than a pre-determined amount; and when either said comparative vector describing said direction of movement of said selected ANALYZE BLOB at said THRESHOLD section of said ANALYZE image frame is not within a predetermined distance of said calculated mean at said THRESHOLD section; or said calculated variance at said THRESHOLD section is not less than a pre-determined amount;

determining whether said weight value of selected ANALYZE BLOB is equal to zero; and when said weight value of said selected ANALYZE BLOB is equal to zero, determining whether to end; and when not determined to end, either updating said selected ANALYZE BLOB track with additional and/or different information and iterating to said analyze said selected ANALYZE BLOB located in an ANALYZE image frame with respect to which said ANALYZE BLOB has not been analyzed; OR selecting said selected ANALYZE BLOB to be a different BLOB of said at least one BLOB than said selected ANALYZE BLOB of said immediately preceding iteration and iterating to said analyze said selected ANALYZE BLOB located in an ANALYZE image frame with respect to said selected ANALYZE BLOB has not been analyzed;

when said weight value of selected ANALYZE BLOB is not equal to zero, updating said weight value by of selected ANALYZE BLOB by incrementing said weight value; and determining whether said incremented weight value is greater than a pre-determined Maximum value; and when said incremented weight value is not greater than a pre-determined junk weight, said junk weight being greater than said initialized value and less than or equal to said Maximum value, determining whether to end; and when not determined to end, either updating said selected ANALYZE BLOB track with additional and/or different information and iterating to said analyze said selected ANALYZE BLOB located in an ANALYZE image frame with respect to which said ANALYZE BLOB has not been analyzed; OR selecting, said selected ANALYZE BLOB to be a different BLOB of said at least one BLOB than said selected ANALYZE BLOB of said immediately preceding iteration and iterating to said analyze said selected ANALYZE BLOB located in an ANALYZE image frame with respect to said selected ANALYZE BLOB has not been analyzed; and when said weight value incremented during analysis of said currently-analyzed sequential image frame is greater than said junk level, updating said current weight value to be equal to zero and determining whether to end; and when not determined to end, either updating said selected ANALYZE BLOB track with additional and/or different information and iterating to said analyze said selected ANALYZE BLOB located in an ANALYZE image frame with respect to which said ANALYZE BLOB has not been analyzed; OR selecting said selected ANALYZE BLOB to be a different BLOB of said at least one BLOB than said selected ANALYZE BLOB of said immediately preceding iteration and iterating to said analyze said selected ANALYZE BLOB located in an ANALYZE image frame with respect to said selected ANALYZE BLOB has not been analyzed;

when both said comparative vector describing said direction of movement of said selected ANALYZE BLOB at said THRESHOLD section of said ANALYZE image frame is within a predetermined distance of said calculated mean at said THRESHOLD section; and said calculated variance at said THRESHOLD section is less than a pre-determined amount;

determining whether said weight value of said selected ANALYZE BLOB is equal to zero; and when said weight value is equal to zero, updating said weight value to be equal to said. Maximum weight value, said Maximum weight value being greater than a sticky weight value, said sticky weight value being greater than a minimum weight value, said minimum weight value being said weight value to which each of said BLOB TRACKs is initialized) and determining whether to end; and when not determined to end, either updating said selected ANALYZE BLOB track with additional and/or different information and iterating to said analyze said selected ANALYZE BLOB located in an ANALYZE image frame step with respect to which said ANALYZE BLOB has not been analyzed; OR selecting said selected ANALYZE BLOB to be a different BLOB of said at least one BLOB than said selected ANALYZE BLOB of said immediately preceding iteration and iterating to said analyze said selected ANALYZE BLOB located in an ANALYZE image frame step with respect to said selected Analyze BLOB;

when said weight value of selected ANALYZE BLOB is not equal to zero, updating said weight value by decrementing said weight value and determining whether said updated (decremented) weight value is equal to said pre-determined sticky weight number; and when updated weight value is not equal to said predetermined sticky weight number, determining whether to end; and when not determined to end, either updating said selected ANALYZE BLOB track with additional and/or different information and iterating to said analyze said selected ANALYZE BLOB located in an ANALYZE image frame with respect to which said ANALYZE BLOB has not been analyzed; OR selecting said selected ANALYZE BLOB to be a different BLOB of said at least one BLOB than said selected ANALYZE BLOB of said immediately preceding iteration and iterating to said analyze said selected ANALYZE BLOB located in an ANALYZE image frame with respect to said selected ANALYZE BLOB has not been analyzed;

when updated weight value is equal to sticky weight number, declaring BLOB to be clutter and determining, whether to end; and when not determined to end, either updating said selected ANALYZE BLOB track with additional and/or different information and iterating to said analyze said selected ANALYZE BLOB located in an ANALYZE image frame with respect to which said ANALYZE BLOB has not been analyzed; OR selecting said selected ANALYZE BLOB to be a different BLOB of said at least one BLOB than said selected ANALYZE BLOB of said immediately preceding iteration and iterating to said analyze said selected ANALYZE BLOB located in an ANALYZE image frame with respect to said selected ANALYZE BLOB has not been analyzed.

* * * * *